W. A. AUSTIN.
PRESSURE BALL JOINT FOR PIPES.
APPLICATION FILED DEC. 22, 1915.
1,197,588.
Patented Sept. 12, 1916.
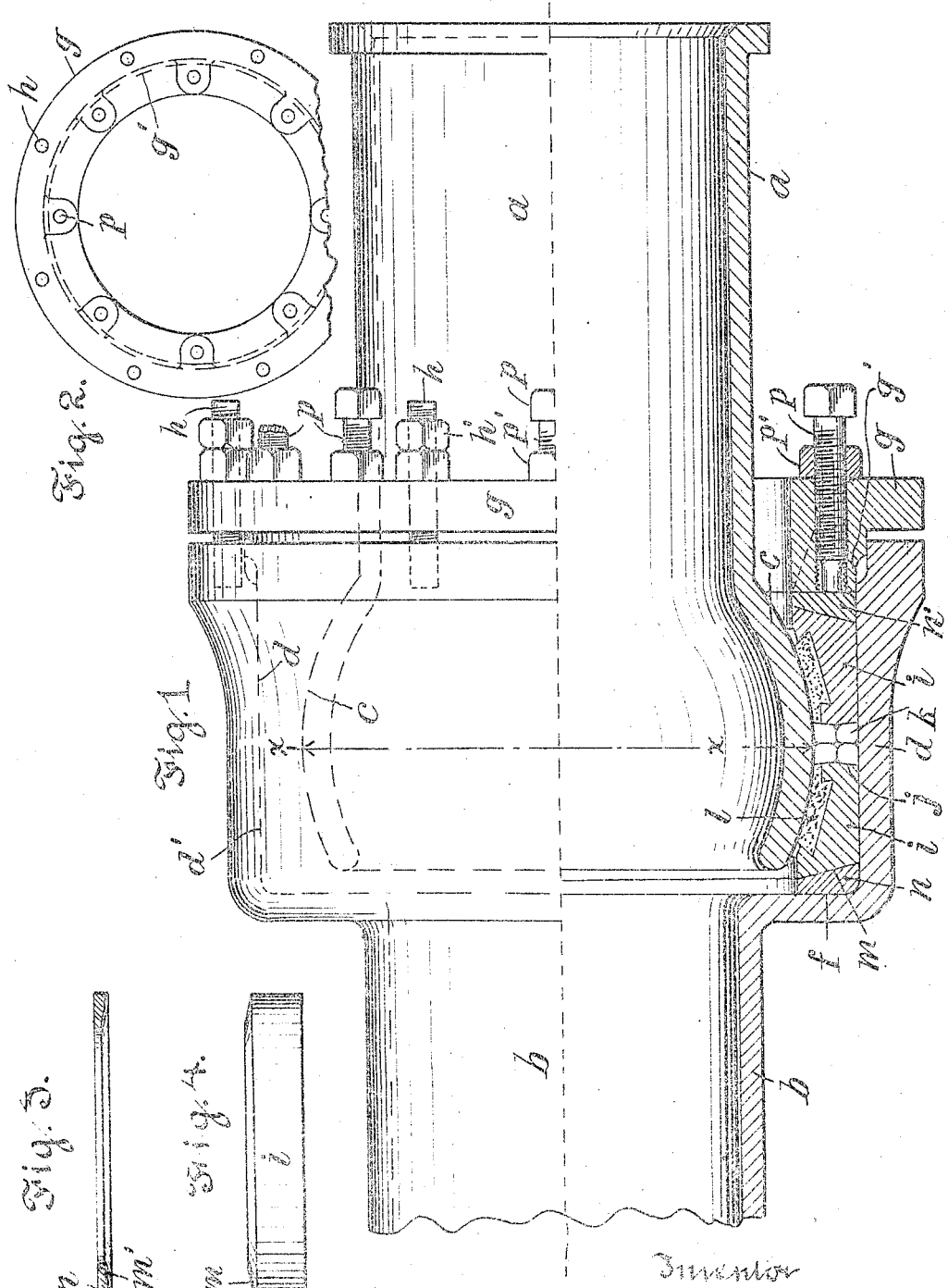

UNITED STATES PATENT OFFICE.

WILLIAM A. AUSTIN, OF LIMA, OHIO, ASSIGNOR TO LIMA LOCOMOTIVE CORPORATION, OF LIMA, OHIO, A CORPORATION OF OHIO.

PRESSURE BALL-JOINT FOR PIPES.

1,197,588.  Specification of Letters Patent.  Patented Sept. 12, 1916.

Application filed December 22, 1915. Serial No. 68,200.

*To all whom it may concern:*

Be it known that I, WILLIAM A. AUSTIN, a citizen of the United States, residing at Lima Club, 417 West Market street, Lima, county of Allen, and State of Ohio, have invented certain new and useful Improvements in Pressure Ball-Joints for Pipes, fully described and represented in the following specification and the accompanying drawings, forming a part of the same.

The object of this invention is to furnish a ball-joint adapted to connect steam-pipes movably, so that the joint may be kept steam-tight when one of the pipes is tipped in relation to the other, and the invention consists in the construction hereinafter described and claimed.

In the drawing, Figure 1 is a side-view of two pipes connected by a joint, the lower half of the view being in section at the center line; Fig. 2 is an end view of the joint-flange; Fig. 3 is a central section of one of the pressure-rings; and Fig. 4 is an edge view of one of the joint-rings.

Pipe-sections $a$ and $b$ are shown connected by a spherical or ball-shaped enlargement $c$ upon the end of the pipe $a$, a casing $d$ having a cylindrical chamber $d'$ therein upon the end of the pipe $b$, and joint-rings with certain special attachments fitted between the interior of the casing and the exterior of the ball. The chamber $d'$ is closed by a flat flange $f$ at one end and is open at the opposite end, to which a joint-flange $g$ is held by studs $h$.

The joint between the casing and the ball is formed by the following elements: Joint-rings $i$ are fitted to opposite sloping surfaces upon the ball, with space between their inner ends $j$ for a yielding packing $k$, and their concave faces next the ball provided with facing packings of Babbitt or other soft metal $l$. The yielding packing is shown in Fig. 1 composed of four strands or annular sub-divisions which imparts a flexibility and yielding character to the packing which cannot be obtained by a single strand. Such yielding packings are commonly made of twisted fibrous material loaded with plumbago or similar substance, but may be made of other yielding substance. The outer edges $m$ of the joint-rings are beveled outwardly, and pressure-rings $n$, $n'$, having corresponding bevels $m'$, are seated upon the inner walls of the casing; and when pressed toward one another crowd the joint-rings toward the surface of the ball, by reason of the bevel upon the several rings. A collar $g'$ is formed upon the inner side of the joint-flange and fitted within the chamber of the casing into contact with the outer pressure-ring $n'$.

The joint-flange is shown secured adjustably to the outer end of the casing by nuts $h'$ upon the studs $h$, and adjusting screws $p$ are shown extended through the joint-flange and collar into contact with the pressure-ring $n'$, so as to force the same toward the pressure-ring $n$ when required. Such pressure operates first, to crowd the joint-rings $i$ toward one another, thus compressing the yielding packing $k$ and crowding it into steam-tight contact with the joint-ring, ball and casing; second, by crowding the joint-rings toward the ball as the rings approach one another; and third, when the soft metal $l$ is worn, by crowding the joint-rings inward toward the ball, by the influence of the pressure-rings upon the beveled ends of the joint-rings.

All the parts which form the steam-joint are self-adjusting to one another, when the adjusting-screws $p$ are screwed inward sufficiently to crowd the parts against the ball in a sufficient degree to make a tight joint; and the maintenance of a tight joint is thus easily effected whenever required, by a slight adjustment of the screws $p$ which, when adjusted, are held in place as usual by jam-nuts $p'$.

The joint-rings applied to the opposite sloping surfaces are necessarily thicker at their outer edges than at their inner edges adjacent to the yielding packing $k$, and are therefore wedge-shaped in two different directions, so that they crowd toward the ball if pressed endwise toward one another in the casing; and, owing to the bevel upon their outer edges, are also pressed toward the ball whenever the yielding packing ceases to yield and the joint-rings are jointly forced away from the casing toward the ball by the beveled pressure-rings $n$, $n'$.

It will be noticed that the ball-joint rings $i$ are of identical cross section as well as the pressure-rings $n$ and $n'$ and are therefore interchangeable with one another, so that rings for a standard ball-joint of such construction may be supplied to the user and substituted for either of the joint-rings when worn. The interchangeability of these parts greatly facilitates the manufacture of a standard ball-joint, and the repair of such joints when used on a locomotive, where the jar and concussions to which they are subjected produce rapid deterioration.

I am aware that it is common to fit joint-rings to opposite surfaces in a ball-joint, and do not claim the same as my invention, but the special constructions which I have set forth in the claims.

Having thus set forth the nature of the invention what is claimed herein is:

1. A steam ball-joint, for pipes, consisting of a ball-shaped enlargement upon one of the pipes, a casing having a cylindrical chamber upon the end of the other pipe, interchangeable joint-rings fitted to opposed sloping surfaces of the ball with opposed bevels upon their outer edges and a yielding packing formed of a plurality of strands between their inner edges, interchangeable pressure-rings applied to the beveled edges of the joint-rings, and a joint-flange upon one end of the casing covering one of the pressure-rings and provided with means for pressing the same toward the opposite pressure-ring.

2. A steam ball-joint, for pipes, consisting of a ball-shaped enlargement upon one of the pipes, a casing having a cylindrical chamber upon the end of the other pipe, interchangeable joint-rings having recesses filled with soft metal fitted to opposed sloping surfaces of the ball and having bevels upon their outer edges and a yielding packing between their inner edges, interchangeable pressure-rings seated within the chamber with beveled faces fitted to the outer edges of the joint-rings, a joint-flange secured upon the open end of the casing, and adjusting screws fitted through the said flange and bearing upon the said pressure-ring to produce a pressure upon the beveled edges of the joint-rings, as and for the purpose set forth.

In testimony whereof I have hereunto set my hand.

WILLIAM A. AUSTIN.